United States Patent
Burg et al.

[11] Patent Number: 6,007,132
[45] Date of Patent: Dec. 28, 1999

[54] LINER FOR A WORK MACHINE BODY AND METHOD FOR MANUFACTURING THE SAME

[75] Inventors: William L. Burg, Decatur; Theodore A. Moutrey, Taylorville; James W. Thais, White Heath, all of Ill.

[73] Assignee: Caterpillar Inc., Peoria, Ill.

[21] Appl. No.: 09/006,231

[22] Filed: Jan. 13, 1998

[51] Int. Cl.⁶ ................................................ B60R 13/01
[52] U.S. Cl. ........................................ 296/39.2; 296/39.1
[58] Field of Search .................... 296/39.1, 39.2

[56] References Cited

U.S. PATENT DOCUMENTS

| | | | |
|---|---|---|---|
| 3,159,420 | 12/1964 | McCrossen | 296/28 |
| 3,480,321 | 11/1969 | Brandt et al. | 296/28 |
| 3,578,375 | 5/1971 | Feinfrock | 296/39 |
| 3,652,123 | 3/1972 | Speers | 296/28 D |
| 3,814,473 | 6/1974 | Lorenzen, Jr. | 296/39 R |
| 3,881,768 | 5/1975 | Nix | 296/39 R |
| 3,953,950 | 5/1976 | Sudyk | 52/127 |
| 4,188,058 | 2/1980 | Resa et al. | 296/39.2 X |
| 4,531,781 | 7/1985 | Hunt et al. | 298/22 P |
| 4,678,738 | 7/1987 | Shimizu et al. | 430/320 |
| 4,725,508 | 2/1988 | Rangaswamy et al. | 428/570 |
| 4,752,098 | 6/1988 | Shock | 296/184 |
| 4,974,895 | 12/1990 | Davenport | 296/39.2 |
| 5,131,709 | 7/1992 | Spica | 296/39.2 |
| 5,165,747 | 11/1992 | Stringer et al. | 296/39.2 X |
| 5,172,953 | 12/1992 | Chamberlain | 296/39.2 |
| 5,185,980 | 2/1993 | Rydberg et al. | 52/506 |
| 5,207,472 | 5/1993 | Gower | 296/39.2 |
| 5,453,329 | 9/1995 | Everett et al. | 428/565 |
| 5,460,431 | 10/1995 | McWilliams | 298/22 AE |
| 5,518,285 | 5/1996 | Dick | 296/39.2 |
| 5,562,321 | 10/1996 | VanHoose | 296/39.1 |
| 5,597,194 | 1/1997 | Daugherty et al. | 296/39.2 |
| 5,599,055 | 2/1997 | Brown | 296/39.2 |
| 5,634,523 | 6/1997 | Kobayashi et al. | 172/818 |
| 5,709,936 | 1/1998 | Besmann et al. | 428/323 |

FOREIGN PATENT DOCUMENTS

| | | |
|---|---|---|
| 1556209 | 1/1970 | Germany. |
| 1257456 | 12/1971 | United Kingdom. |
| 96/32313 | 10/1996 | WIPO ............ B62D 33/02 |

OTHER PUBLICATIONS

Patent Application—Serial No. 08/978,327 filed Nov. 25, 1997 entitled "Liner for a Work Machine Body"—Moutrey.
Tricon Sales Brochure—Super C—Cladded Wear Plate 1989 Issue—8 Pages.
Triten Corporation—T200 X Hardfacing Eletrode Repair Kit—8 Pages.
Triten Overlay Product Systems—BHP Steel Producer Duro–Plate (Australia)—7 pages.

*Primary Examiner*—Joseph D. Pape
*Attorney, Agent, or Firm*—John J. Cheek; Bradford G. Addison

[57] ABSTRACT

A liner for a work machine body, such as the body of an off-highway truck, protects the body from wear. The liner has a plate with openings through the plate arranged in a preselected pattern. The plate is of a size to fit a particular portion of the body and is typically removably fastened to the body. The plate has raised strips of abrasion-resistant cladding, such as chromium carbide, bonded to the top surface thereof. The raised strips cause material to tumble, instead of to slide, when being removed from the truck. The tumbling action reduces wear on the liner.

15 Claims, 3 Drawing Sheets

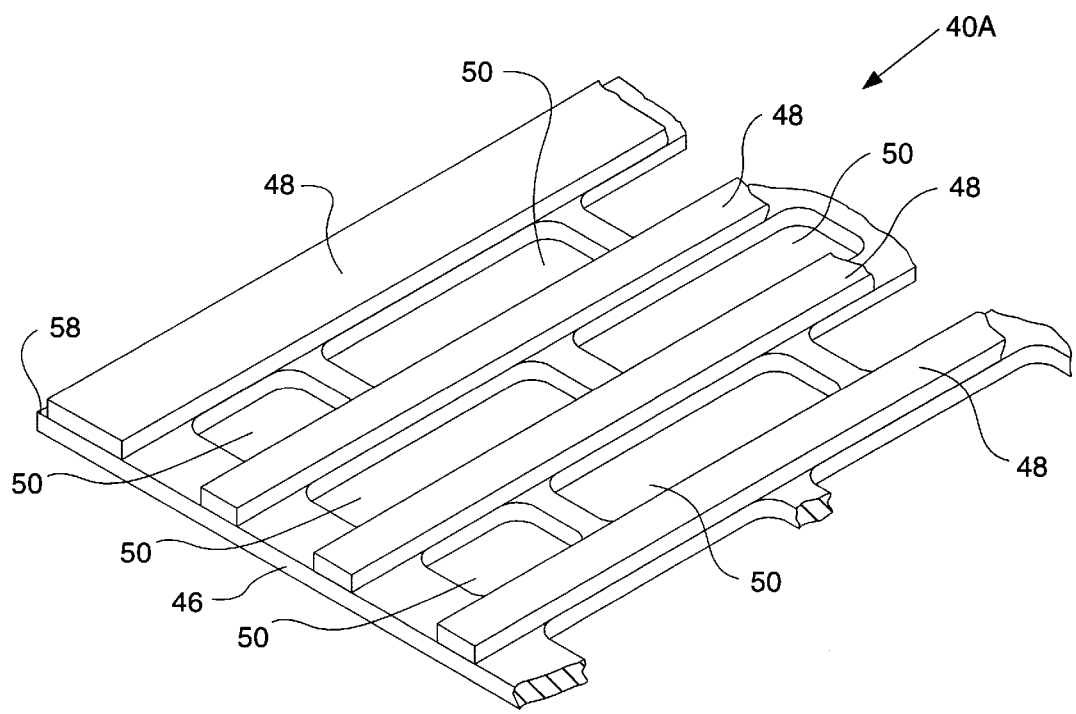
Fig-3-
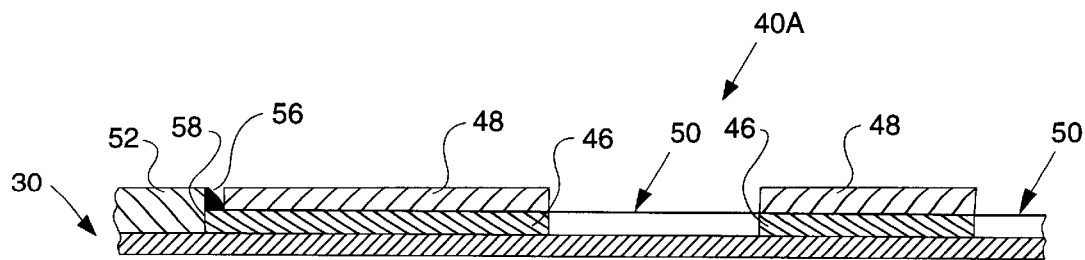
Fig-4-

6,007,132

LINER FOR A WORK MACHINE BODY AND METHOD FOR MANUFACTURING THE SAME

TECHNICAL FIELD

This invention relates to liners for protecting material carrying bodies from wear, such as occurs in trucks beds. More particularly, the invention relates to liners which cause material to tumble instead of to slide when dumping from a truck body.

BACKGROUND ART

Work machines which carry material are subject to wear through the movement of material in the body of the machine. For example, an off-highway truck typically has a material-carrying body which can be moved to an upright position to eject the material through an opening in the body. This wear is particularly aggravated, for example, by the sliding of material across the portion of the bed or floor adjacent the rear opening from which the material is ejected. Other trucks for hauling and dumping may have similar problems with wear.

In an attempt reduce wear, many solutions have been tried. For example, sheets of material as liners are sometimes added to a truck body to provide additional protection. To increase the durability of such sheets, the entire surface of the sheet has been provided with a durable cladding of abrasion-resistant chromium carbide material. However, such liners are still subject to the same high wear of sliding materials as the truck bodies they protect since they have a substantially smooth upper surface, which permits the materials to slide from the body. Another solution has been to attach bars to the bed or floor of a truck body in rows across the width of the bed. Similarly, a cross hatch of plates approximately two inches high have been added to provide "boxes" on the bed of the truck. The bars or boxes cause material to tumble instead of slide as it moves across the truck bed be ejected from the rear opening. This tumbling motion reduces wear by tending to eliminate the high wear characteristics of sliding material. However, these so-called tumbler bars or boxes require a considerable amount of welding to attach, involve the handling of a large number of different parts, are limited in the way they can be attached (typically only by conventional welding) and are susceptible to breaking loose. If they do break loose, the metal parts can be ejected from the truck body into another material handling device, such as a rock crusher, and cause damage to that device.

One known solution to the problems presented by tumbler bars or boxes is to use a liner plate of hard steel having a pattern of openings cut therethrough. The openings through the liner plate cause material exiting the body to tumble as they pass thereover and also trap fines, both of which reduce wear on the liner plate. However, such a liner plate is advantageously formed from hard steel, e.g. 400 to 500 Brinell hardness, which does not lend itself to welding due to the difficulty of preheating the steel sufficiently. As a result, fasteners, such as bolts or rivets, may be needed to secure the liner plate to the machine body.

This invention is directed to overcoming one or more of the problems set forth above.

DISCLOSURE OF THE INVENTION

In accordance with one aspect of this invention, a prefabricated liner for a high wear portion of a body of a work machine comprises a plate having top and bottom surfaces, the bottom surface being of a configuration sufficient for resting on the work machine body for the plate to support loads in the work machine body. The plate has plurality of mutually-spaced, raised strips of abrasion-resistant cladding overlaid across the top surface thereof. The raised strip preferably comprise chromium carbide.

In accordance with another aspect of the invention, the liner plate has a plurality of openings passing therethrough from the top surface to the bottom surface at locations between the raised strips.

In accordance with yet another aspect of this invention, a liner for a high wear area of the body of a work machine is manufactured by providing a plate having a top surface and a bottom surface and forming plural raised strips of abrasion-resistant cladding at mutually-spaced locations across the top surface of the plate. The raised strips preferably comprise chromium carbide. The manufacture may also include the step of providing a plurality of openings extending through the plate from the top surface thereof to the bottom surface thereof, with each of the openings being provided between the locations of a pair of the raised strips. These opening can be provided either before or after the raised strips are formed on the plate.

Other features and advantages of this invention will become apparent from the following description and the accompanying drawings.

BRIEF DESCRIPTION OF THE DRAWINGS

FIG. 3 is a fragmentary, perspective view of a portion of the liner illustrated in FIG. 2.

FIG. 4 is a fragmentary, cross-sectional view taken along line 4—4 of FIG. 2 showing a portion of the liner mounted to the truck body.

BEST MODE FOR CARRYING OUT THE INVENTION

Figure 1:
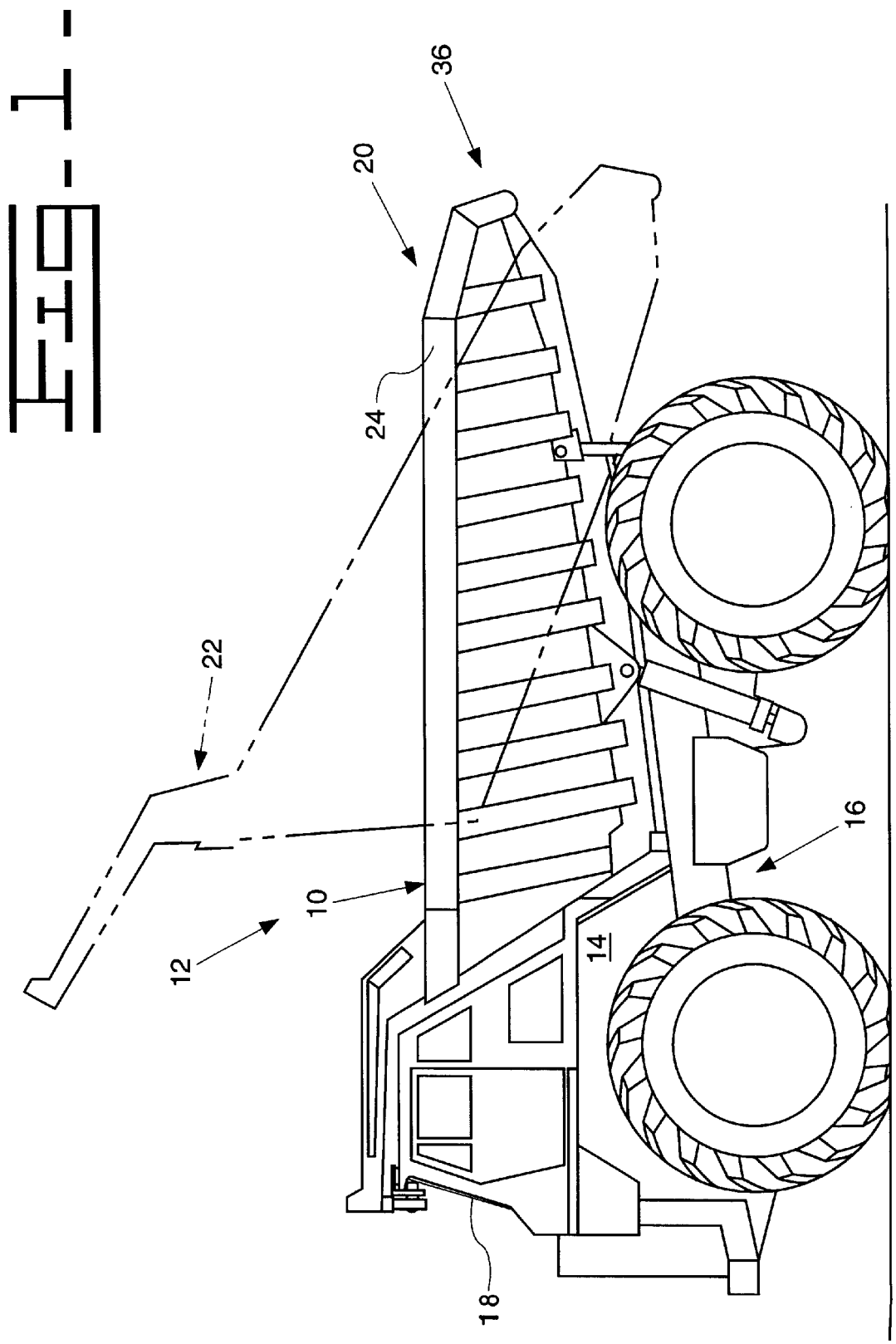
FIG. 1 is a side view of an off-highway truck on which a liner in accordance with this invention may be used.

With reference to FIG. 1, a body 10 for a work machine 12 is shown as, for example, the material carrying body of an off-highway truck 14. The body 10 is constructed and of an appropriate configuration to receive, transport and dump loads for earthmoving and construction purposes as well known in the art. Typically, the body 10 is carried on a chassis 16 having a cab 18 from which an operator can control the orientation of the body 10 to position it in either a horizontal, or load receiving and carrying, position 20 or a relatively upright position 22 (shown in phantom) from which a load, such as dirt, coal or other material can be dumped.

Figure 2:
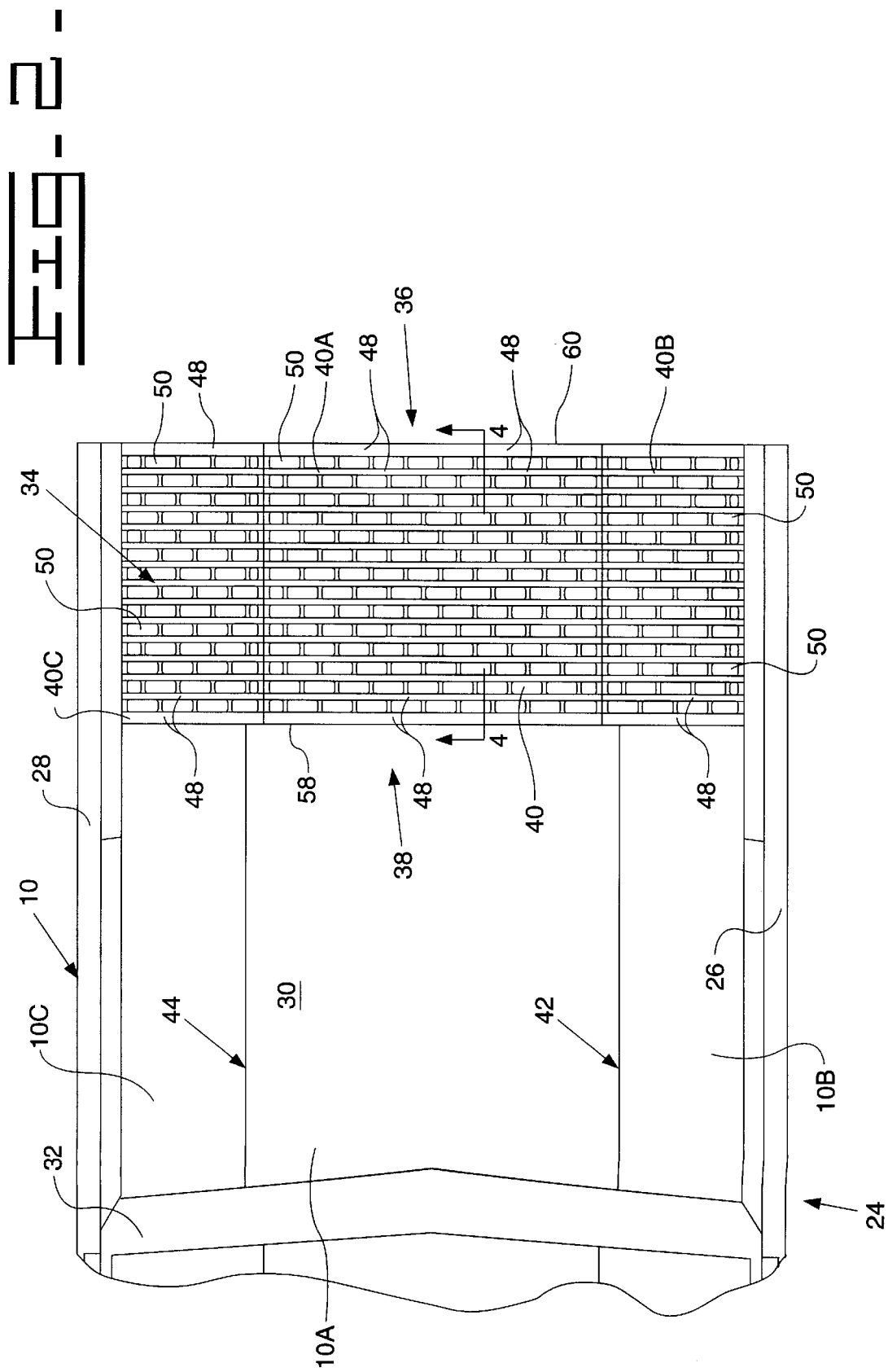
FIG. 2 is a plan view of a portion of a truck body of the off-high truck of FIG. 1 showing a liner according to this invention.

Referring also to FIG. 2, the body 10 has a bed 24 which includes first and second sides or side walls 26,28, a bottom 30, and a forward or end wall 32. The first and second sides 26,28 and end wall 32 are each connected to the bottom 30. Each of these elements is of a desired size, which is defined to be dimension and shape, such that a load carrying cavity 34 is formed of desired configuration for the type of load carried. For example, the illustrated cavity 34 has a flat bottom configuration. The load carrying cavity 34 has a rear opening 36 through which material escapes when the bed 24 is moved from the horizontal 20 to the upright position 22.

A rear gate or other device at the rear opening 36 is sometimes used in other types of trucks to contain the load.

With reference to FIGS. 2 through 4, a liner, generally designated 38, is provided for protecting the body 10, particularly in the high wear portions where it is cost effective to provide additional protection. In off-highway trucks, the high wear portions are typically the approximate one-third of the bed 24 adjacent the rear opening 36.

The liner 38 comprises at least one liner plate, and the illustrated liner 38 comprises three such plates, namely a center plate 40A and left and right plates 40B and 40C. As best shown in FIG. 2, the illustrated body 10 is formed in three section 10A, 10B, and 10C mated together along two longitudinally-extending field joints designated 42 and 44. The center liner plate 40A is preferably narrower than the center body section 10A and the left and right liner plates 40B, 40C are preferably wider than the corresponding body sections 10B, 10C. As a result, each of the left and right liner plates 40B, 40C overlaps a field joint 42, 44 in the body 10, which adds rigidity to the body 10.

Apart from size and shape considerations, the liner plates 40 may be substantially identical. Therefore, further discussion will be limited to the center liner plate 40A, it being understood that the other liner plates 40B, 40C are configured and attached to the body 10 in substantially the same manner.

The liner plate 40A comprises a base plate 46, which is preferably formed from mild steel, and raised strips 48 of abrasion-resistant cladding extend laterally across the top surface the base plate 46. The strips 48 preferably comprise chromium carbide, but cobalt-based or other suitable abrasion-resistant cladding could also be used. The strips 48 are preferably provided across the top surface of the base plate 46 by an overlaying process wherein the strips 48 are bonded to the base plate 46. Such overlaying is commercially-available from various sources, such as the Overlay Product Systems (OPS) division of Triten Corporation, Houston, Tex. or Tricon Metals & Services, Inc., Birmingham, Ala. Because overlaying is well-known in the art and commercially-available, the details thereof are not discussed herein. However, one commercially-available method of overlaying comprises passing a special consumable welding electrode (not shown) across the base plate 46 and feeding a granulated alloy powder (not shown) onto the base plate 46 just ahead of the electrode. The alloy powder combines with the electrode material and the diluted base plate material to form a raised strip of abrasion-resistant cladding bonded to the top surface of the base plate 46. Suitable overlaid cladding available from the aforementioned Triten Corporation or Tricon Metals results in raised strips 48 have a hardness in the range of approximately 540 brinell to 600 brinell or higher. For example, T-200X® overlay available from the aforementioned Triten Corporation provides approximately 540 brinell hardness, whereas Super C® cladding available from the aforementioned Tricon Metals provides at least 600 brinell hardness.

Presently, it is preferred to utilize a base plate 46 approximately 10 mm (⅜") thick and to provide strips 48 of abrasion-resistant cladding across the top surface of the plate 46 that are approximately 10 mm (⅜") thick and approximately 50 mm (1") wide, with adjacent strips 48 being separated by approximately 100 mm (2"). However, the forward-most and rearward-most strips 48 is preferably somewhat wider than the other strips 48, as shown in the figures. Here, it will be noted that several closely adjacent passes of the welding electrode may be required to form strips 48 of the desired width.

With continued reference to FIGS. 2 through 4, the base plate 46 may have openings 50 provided therein from the top surface to the bottom surface thereof. The openings 50 are arranged in rows extending between adjacent raised strips 48 and form a preselected grid pattern. The openings 50 may be staggered laterally from row to row, as illustrated, or the may alternately be aligned from row to row. Because the base plate 46 is preferably formed from a mild steel, the openings 50 can be formed in a variety of manners, such as cutting or punching. In addition, the openings 50 can be formed in the base plate 46 either before or after the base plate 46 is provided with the raised strips 48 of abrasion-resistant cladding.

Referring to FIG. 4, the bottom 30 of the body 10 has an upper, main floor 52 that overlies a lower, sub-floor 54. The main floor 52 covers approximately the forward two-thirds of the bottom 30, whereas the sub-floor 54 is substantially the same length as the entire bottom 30 of the body 10. The liner plate 40A is supported atop the sub-floor 54 and covers a central portion of the rear one-third of the body 10, which rear one-third is typically the high-wear portion for off-highway trucks.

The plate 40A can be attached to the bed 24 in a variety of ways, preferably for removal of the plate 40A when worn. Due to the heavy duty application in off-highway trucks, a preferred approach is to weld the plate 40A to the bed 24. Welding resists vibration and is durable, and the plate 40A is removable through breaking of the welds for replacement purposes. As shown in FIG. 4, it is preferred to provide a fillet weld 56 across the entire leading edge 58 of the liner plate 40A. To this end, the forward-most strip 48 of abrasion-resistant cladding is inset slightly from the leading edge 58. This permits the fillet weld 56 to be made directly between main floor 54 and the mild steel base plate 46 of the liner plate 40A. Although not shown in detail, it is preferred for the trailing edge 60 (FIG. 2) of the liner plate 40A to extend slightly past the rear end of the body 10 so that a fillet weld (not shown) can be made between the rear end of the sub-floor 54 and the bottom surface of the base plate 46 at the trailing edge 60 thereof. Additional welds (not shown) can be provided as needed between the base plate 46 and the sub-floor 54 of the body 10 along a margin of some of the openings So in the base plate 46. It will be noted that no preheating of the base plate 46 is required since it is made from mild steel and no bolts or the like are required to fasten the liner plate 40A to the body 10.

Although the illustrated body 10 has a flat floor configuration, as mentioned above, it will be understood the a liner 38 in accordance with this invention may be used with other body configurations. For example, the body may alternately have a generally V-shaped bottom. Because the illustrated body 10 comprises of flat elements of select sizes, the plates 40 comprise flat sheets of material of appropriate sizes which rest against the corresponding portion of the bed 24. Where the bed 24 may have a contour, which includes curvilinear configurations, the plates 40 could similarly be configured to conform with a portion of the bed 24.

INDUSTRIAL APPLICABILITY

The disclosed liner 38 provides an extremely durable and flexible approach to protecting the truck body 10 from wear. The plate or plates 40 of the liner 38 can be prefabricated and replaced when worn. This is particularly convenient in off-highway truck applications where the trucks are too large to transport great distances for repair and downtime of a truck is costly.

The raised strips 48 on the plates 40 are oriented transverse to the direction of travel of material escaping from the cavity 34 to cause material escaping from the cavity 34 to tumble instead of sliding. Such tumbling occurs because material, as it moves toward the rear opening 36, tends to catch on the raised strips 48. The liner 38 thus reduces wear to the parent body 10 through not just the protection afforded by the thickness of the liner 38 itself, but also the tumbling action. In addition, while the openings 50 in the liner plates 40 reduce the weight of the liner plates 40, the openings 50 may also trap fine material therein, thereby further insulating the bed 24 from impact and wear.

Because the base plate 46 of each liner plate 40 is formed from mild steel, the liner plates 40 can be readily secured to the floor 30 of the body 10 by conventional welding. No difficulty in preheating the material is faced since the base plate is not hard steel, and no bolts or other fasteners are required to attach the liner plates 40 to the body 10, which simplifies assembly of the liner 38 onto the body 10. The raised strips 48 are highly abrasion-resistant, which prolongs the useful life of the liner 38. Moreover, as a result of the overlaying process by which the raised strips 48 are applied to the base plate 46, the strips 48 are not likely to break loose from the base plate 46 and make their way into a material handling device, such as a rock crusher, which receives material from the truck body 10.

Although the presently preferred embodiments of this invention have been described, it will be understood that within the purview of the invention various changes may be made within the scope of the following claims.

We claim:

1. A prefabricated liner for a high wear portion of a body of a work machine, comprising:
    a plate having top and bottom surfaces, said bottom surface being of a configuration sufficient for resting on said work machine body for said plate to support loads in said work machine body; and
    a plurality of mutually-spaced, raised strips of abrasion-resistant cladding overlaid across the top surface of said plate.

2. The liner of claim 1 wherein said raised strips comprise chromium carbide.

3. The liner of claim 1 wherein said plate has a plurality of openings passing therethrough from said top surface to said bottom surface at locations between said raised strips.

4. The liner of claim 3 wherein said openings form a preselected pattern.

5. The liner of claim 3 wherein said raised strips comprise chromium carbide.

6. The liner of claim 1 wherein said raised strips are oriented relative to said plate such that, during use, material traveling over said liner travels transverse to said strips.

7. In a prefabricated liner for a high wear portion of the body of a work machine comprising a plate having top and bottom surfaces, said plate having a plurality of mutually-spaced openings passing therethrough from said top surface to said bottom surface and being arranged in a preselected pattern, said bottom surface being of a configuration sufficient for resting on said work machine body for said plate to support loads in said work machine body, the improvement wherein portions of said plate between said openings are overlaid with raised strips of abrasion-resistant cladding.

8. The improvement of claim 7 wherein said raised strips comprise chromium carbide.

9. The improvement of claim 7 wherein the openings in said plate are arranged in a plurality of adjacent rows and wherein each of said raised strips extends between a pair of said adjacent rows.

10. A method for manufacturing a liner for a high wear area of the body of a work machine, comprising the steps of:
    providing a plate having a top surface and a bottom surface, said bottom surface being of a configuration sufficient for resting on said work machine body; and
    forming plural raised strips of abrasion-resistant cladding at mutually-spaced locations across the top surface of said plate.

11. The method of claim 10 wherein said raised strips comprise chromium carbide.

12. The method of claim 10 further comprising the step of providing a plurality of openings extending through said plate from the top surface thereof to the bottom surface thereof, each of said openings being provided between the locations of a pair of said raised strips.

13. The method of claim 12 wherein said plurality of openings are formed after said raised strips are formed on said plate.

14. The method of claim 12 wherein said plurality of openings are formed before said raised strips are formed on said plate.

15. The method of claim 10 wherein said raised strips are oriented relative to said plate such that, during use, material traveling over said liner travels transverse to said strips.

* * * * *